(12) United States Patent
Leonhartsberger et al.

(10) Patent No.: US 12,539,830 B2
(45) Date of Patent: Feb. 3, 2026

(54) MOTOR VEHICLE HEADLAMP

(71) Applicant: ZKW Group GmbH, Wieselburg (AT)

(72) Inventors: Rudolf Leonhartsberger, Zelking (AT); Georg Pitterle, Texing (AT); Christian Jackl, Wieselburg (AT); Christoph Bierwipfl, St. Martin-Karlsbach (AT); Roman Popp, Purgstall an der Erlauf (AT); Andreas Kreuzer, Steyr (AT); Robert Stamminger, Neumarkt an der Ybbs (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/277,323

(22) PCT Filed: Jan. 18, 2022

(86) PCT No.: PCT/EP2022/051012
§ 371 (c)(1),
(2) Date: Aug. 15, 2023

(87) PCT Pub. No.: WO2022/175003
PCT Pub. Date: Aug. 25, 2022

(65) Prior Publication Data
US 2024/0181998 A1 Jun. 6, 2024

(30) Foreign Application Priority Data
Feb. 17, 2021 (EP) ..................... 21157610

(51) Int. Cl.
*B60S 1/56* (2006.01)
*B60Q 1/00* (2006.01)
*B60S 1/04* (2006.01)

(52) U.S. Cl.
CPC ............ *B60S 1/566* (2013.01); *B60Q 1/0023* (2013.01); *B60S 1/0411* (2013.01)

(58) Field of Classification Search
CPC ....... B60S 1/566; B60S 1/0411; B60Q 1/0023
See application file for complete search history.

(56) References Cited

U.S. PATENT DOCUMENTS

| 3,667,082 A | 6/1972 | Hoyler |
| 4,246,303 A * | 1/1981 | Townsend ............... B60R 13/04 |
| | | 52/716.5 |

(Continued)

FOREIGN PATENT DOCUMENTS

| DE | 19632252 A1 | 1/1998 | |
| GB | 1245727 A | 9/1971 | |
| GB | 2257900 A * | 1/1993 | ............ B60S 1/0405 |

OTHER PUBLICATIONS

Extended European Search Report Issued in European Patent Application No. 21157610.3, dated Jul. 14, 2021 (7 Pages).

(Continued)

*Primary Examiner* — Abdulmajeed Aziz
*Assistant Examiner* — Jessica M Apenteng
(74) *Attorney, Agent, or Firm* — Eversheds Sutherland (US) LLP

(57) ABSTRACT

Motor vehicle headlight (1), comprising a lens ( ) a screen (3), a windscreen wiper (4) with a wiper blade (4a), which is arranged between the screen (3) and the lens (4a), a drive device (5), which is designed to move the wiper blade (4a) back and forth between a starting position and an end position, wherein an area (2b) of the lens (2) to be cleaned can be cleaned by moving the wiper blade (4a) from the starting position to the end position or from the end position to the starting position and by the contact of the wiper blade (4a) with the outside of the lens (2), wherein the wiper blade (4a) is located completely below an upper edge (3a) of the (Continued)

screen (3) in the starting position, and extends partially or completely over the upper edge (3a) of the screen (3) in the end position.

8 Claims, 1 Drawing Sheet

(56) References Cited

U.S. PATENT DOCUMENTS

| | | | |
|---|---|---|---|
| 7,029,151 B2* | 4/2006 | Strazzanti | B60Q 1/18 |
| | | | 362/512 |
| 2017/0363266 A1* | 12/2017 | Feil | F21S 41/25 |
| 2020/0130488 A1* | 4/2020 | Choi | B60J 10/45 |
| 2020/0346621 A1* | 11/2020 | Whikehart | B60S 1/0862 |

OTHER PUBLICATIONS

International Search Report and Written Opinion Issued in International Patent Application No. PCT/EP2022/051012, dated Mar. 29, 2022 (15 Pages).

* cited by examiner

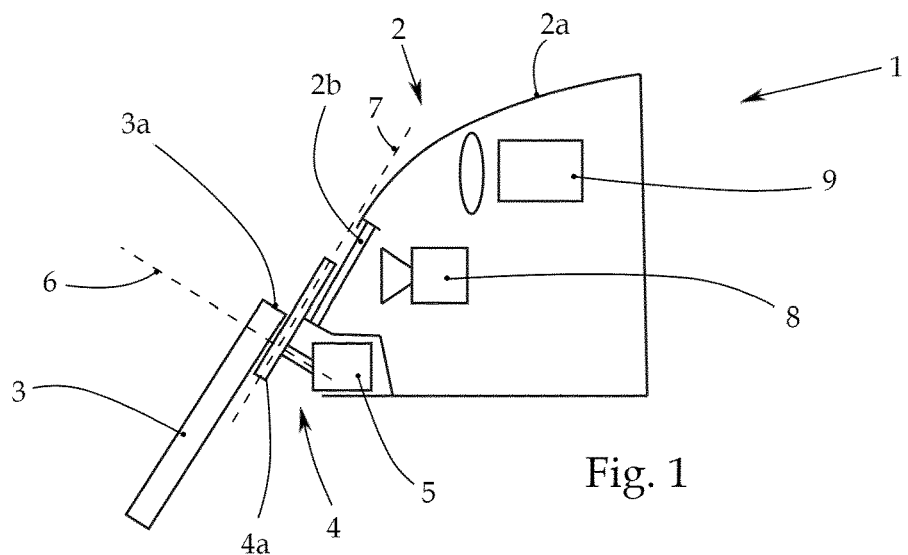
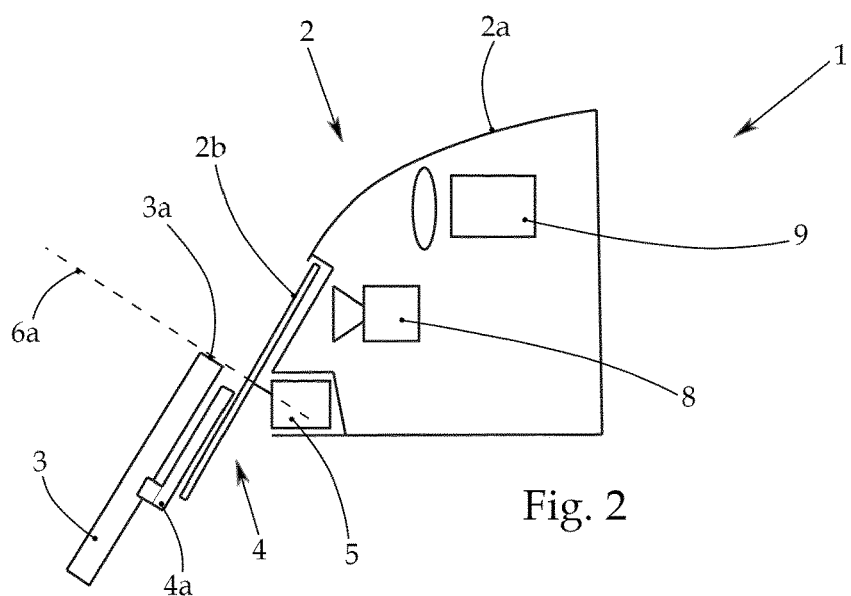
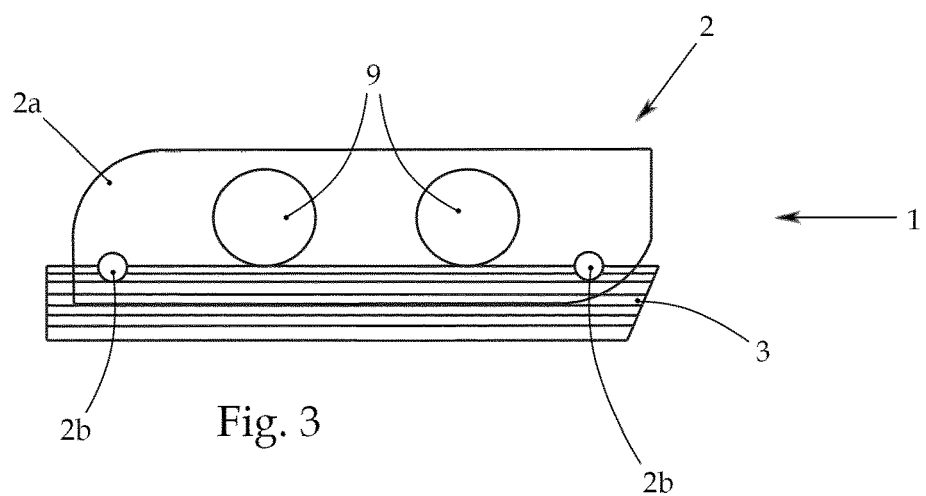

MOTOR VEHICLE HEADLAMP

The invention relates to a motor vehicle headlight, comprising
- a lens,
- a screen, which can be attached to the lens, wherein in a state attached to the lens, the screen extends from a lower side of the lens vertically towards an upper side of the lens, wherein the vertical extent of the screen is smaller than the vertical extent of the lens, wherein the screen has an upper edge, which defines the highest vertical extent of the screen relative to the lens,
- a windscreen wiper with a moveably mounted wiper blade, which is arranged between the screen and the lens, wherein the wiper blade makes contact with an outside of the lens facing the screen,
- a drive device, which is designed to move the wiper blade back and forth between a starting position and an end position, wherein an area of the lens to be cleaned can be cleaned by moving the wiper blade from the starting position to the end position or from the end position to the starting position and by the contact of the wiper blade with at least part of the outside of the lens.

The invention further relates to a motor vehicle headlight, comprising
- a lens, wherein the lens is formed from at least two areas, wherein a first area is designed to be stationary and a second area, the area to be cleaned, is designed to be moveable relative to the first area,
- a screen, which extends from a lower side of the lens vertically towards an upper side of the lens, wherein the vertical extent of the screen is smaller than the vertical extent of the lens, wherein the screen has an upper edge, which defines the highest vertical extent of the screen relative to the lens.

Generic motor vehicle headlights are known from the prior art, which have windscreen wipers for cleaning a lens of the motor vehicle headlight. Given that wiper blades of the windscreen wiper have to rest against the outside of the lens, they are disadvantageously fully exposed to the weather conditions, reducing the service life of the wiper blades and thus also the quality of the cleaning of the lens.

The object of the present invention consists in mitigating or eliminating the disadvantages of the prior art. The objective of the invention is therefore in particular to create a motor vehicle headlight, in which the cleaning of a lens of the motor vehicle headlight is improved.

This object is achieved by a motor vehicle headlight having the features recited in the appended claims.

According to the invention, the wiper blade is located completely below the upper edge of the screen in the starting position, and extends partially or completely over the upper edge of the screen in the end position.

This has the advantage that the wiper blade is protected from the weather in the starting position as the wiper blade is located behind the screen or between the screen and the lens in the starting position. A further advantage is that the wiper blade is not visible from the outside to an observer of the motor vehicle headlight. The area of the lens to be cleaned can in particular be cleaned by moving the wiper blade. The lens is in particular designed to close off a housing of the motor vehicle headlight. In this publication, cleaning is in particular understood to be the mechanical removal of impurities.

It can be provided that the lens is formed from at least two areas, wherein a first area has a first material and a second area, the area to be cleaned, has a second material, wherein the first and the second material are preferably different. The second areas can be formed in one piece or as a single piece.

It can be provided that the first material has a lower hardness than the second material. This has the advantage that the second area to be cleaned has a higher mechanical strength.

Cleaning the second area with the windscreen wiper can therefore cause less mechanical damage.

It can be provided that the first material comprises a plastic and the second material comprises a glass. In particular, the first and/or second material are transparent.

It can be provided that the wiper blade is rotatably mounted about an axis of rotation, wherein the axis of rotation is oriented substantially orthogonal to the lens, wherein the transition from the starting position to the end position or from the end position to the starting position corresponds to a rotation of the wiper blade about the axis of rotation. The wiper blade is preferably rod-shaped and comprises a rubberized section, which makes contact with the outside of the lens. As the wiper blade rotates about the axis of rotation, a first end of the wiper blade can move along a circular path, wherein a second end of the wiper blade, which lies diametrically opposite the first end, can be arranged in the centre of the circular path.

It can be provided that the wiper blade can be moved along a, preferably vertical, axis, wherein the axis is oriented substantially parallel to the lens, wherein the transition from the starting position to the end position or from the end position to the starting position corresponds to a translation of the wiper blade along the axis. The wiper blade preferably has a length, which can be oriented substantially orthogonal to the axis. In the end position, the wiper blade can be arranged completely above the upper edge of the screen.

It can be provided that the motor vehicle headlight further comprises:
- a sensor device for optically detecting an environment of the motor vehicle headlight, wherein the sensor device is arranged within the motor vehicle headlight in such a way that the optical detection of the environment occurs through the area of the lens to be cleaned. This has the advantage that the second area of the lens, the area through which the sensor device can detect the environment of the motor vehicle headlight, can be cleaned with the windscreen wiper, whereby invariably optimal and impairment-free detection of the environment with the sensor device can take place. In particular, the environment is detected with the sensor device exclusively through the second area.

It can be provided that the motor vehicle headlight further comprises:
- an illumination device for generating and emitting a light function into an environment of the motor vehicle headlight, wherein the illumination device is arranged within the motor vehicle headlight in such a way that the light function is emitted through the first area of the lens. For example, it can be provided that the light function is emitted into the environment exclusively through the second area.

According to an alternative embodiment of a motor vehicle headlight according to the invention, it comprises
- a windscreen wiper with a wiper blade, which is arranged in a fixed position between the screen and the lens in such a manner that the wiper blade makes contact with an outside of the lens facing the screen, wherein the wiper blade is located completely below the upper edge of the screen, a drive device, which is designed to move the second area of the lens relative to the first area and relative to the wiper blade, wherein the second area can be cleaned by moving the second area and by the contact of the second area with the wiper blade.

This has the advantage that the wiper blade is protected from the weather as the wiper blade is always located behind the screen or between the screen and the lens. A further advantage is that the wiper blade is not visible from the outside to an observer of the motor vehicle headlight. The second area of the lens can in particular be cleaned by moving the second area relative to the first area and the wiper blade. The second area can in particular be circular, wherein the wiper blade preferably has a length, which is greater than or the same as the radius of the circular second area. The first area can have an opening corresponding to the shape of the second area, in which the second area is arranged or accommodated. A sealing element can be arranged between the first and second area, which is designed to seal the contact area between the first and second area.

It can be provided that the first area has a first material and the second area, the area to be cleaned, has a second material, wherein the first and the second material are preferably different.

It can be provided that the first material has a lower hardness than the second material. This has the advantage that the second area to be cleaned has a higher mechanical strength. Cleaning the second area with the wiper blade can therefore cause less mechanical damage.

It can be provided that the first material comprises a plastic and the second material comprises a glass. In particular, the first and/or second material are transparent.

It can be provided that the second area of the lens is rotatably mounted about an axis of rotation, wherein the axis of rotation is oriented substantially orthogonal to the lens, wherein the second area can be cleaned by rotating the second area about the axis of rotation and by the contact of the second area with the wiper blade. The second area is preferably rotated with the drive device.

It can be provided that the motor vehicle headlight further comprises:
a sensor device for optically detecting an environment of the motor vehicle headlight, wherein the sensor device is arranged within the motor vehicle headlight in such a way that the optical detection of the environment occurs through the second area of the lens. This has the advantage that the second area of the lens, the area through which the sensor device can detect the environment of the motor vehicle headlight, can be cleaned by moving the second area relative to the first area and relative to the windscreen wiper, whereby invariably optimal and impairment-free detection of the environment with the sensor device can take place.

It can be provided that the motor vehicle headlight further comprises:
an illumination device for generating and emitting a light function into an environment of the motor vehicle headlight, wherein the illumination device is arranged within the motor vehicle headlight in such a way that the light function is emitted through the first area of the lens. In particular, the light function is emitted into the environment exclusively through the second area.

The motor vehicle headlight according to the first or second embodiment can comprise a housing, wherein the lens closes off the housing. The sensor device and the illumination device can be arranged within the housing.

In the context of this description, the terms "above", "below", "horizontal", "vertical" should be understood as indications of orientation when the motor vehicle headlight is arranged in its normal position of use after having been fitted to a motor vehicle.

The invention is outlined in more detail below based on a preferred exemplary embodiment, to which it is, however, not limited: In the drawings:

FIG. 1 shows a schematic side view of a first embodiment of a motor vehicle headlight according to the invention;

FIG. 2 shows a schematic side view of a second embodiment of a motor vehicle headlight according to the invention;

FIG. 3 shows a schematic front view of a third embodiment of a motor vehicle headlight according to the invention.

FIG. 1 shows a first embodiment of a motor vehicle headlight 1 according to the invention, comprising a lens 2 and a screen 3. The screen 3 can be attached to the lens 2, wherein the screen 3 in the exemplary embodiment shown is attached to the lens 2 and extends from a lower side of the lens 2 vertically towards an upper side of the lens 2. The vertical extent of the screen 3 is smaller than the vertical extent of the lens 2, wherein the screen 3 has an upper edge 3a, which defines the highest vertical extent of the screen 3 relative to the lens 2.

The motor vehicle headlight 1 further comprises a windscreen wiper 4 with a moveably mounted wiper blade 4a, which is arranged between the screen 3 and the lens 2, wherein the wiper blade 4a makes contact with an outside of the lens 2 facing the screen 3.

The motor vehicle headlight 1 further comprises a drive device 5, which is designed to move the wiper blade 4a back and forth between a starting position and an end position, wherein an area of the lens 2 to be cleaned can be cleaned by moving the wiper blade 4a from the starting position to the end position or from the end position to the starting position and by the contact of the wiper blade 4a with at least part of the outside of the lens 2. The wiper blade 4a is located completely below the upper edge 3a of the screen 3 in the starting position, and extends partially or completely over the upper edge 3a of the screen 3 in the end position. In FIG. 1, the wiper blade 4a is in the end position.

The lens 2 is formed from at least two areas 2a, 2b, wherein a first area 2a has a first material and a second area 2b, the area to be cleaned, has a second material, wherein the first and the second material are different. The first material has a lower hardness than the second material. In the exemplary embodiment shown, the first material is a, preferably transparent, plastic and the second material is a, preferably transparent, glass.

The wiper blade 4a is rotatably mounted about an axis of rotation 6, wherein the axis of rotation 6 is oriented substantially orthogonal to the lens 2. The transition from the starting position to the end position or from the end position to the starting position corresponds to a rotation of the wiper blade 4a about the axis of rotation 6.

The wiper blade 4a can also be moved along a, preferably vertical, axis 7, wherein the axis 7 is oriented substantially parallel to the lens 2, and the transition from the starting position to the end position or from the end position to the starting position corresponds to a translation of the wiper blade 4a along the axis 7. In this alternative embodiment, the wiper blade 4a is located completely above the upper edge 3a of the screen 3 in the end position.

In the exemplary embodiments shown according to FIGS. 1 and 2, the motor vehicle headlight 1 further comprises a sensor device 8 for optically detecting an environment of the motor vehicle headlight 1. The sensor device 8 is arranged within the motor vehicle headlight 1 in such a way that the optical detection of the environment occurs through the area 2b of the lens 2 to be cleaned.

In the exemplary embodiments shown according to FIGS. 1 and 2, the motor vehicle headlight 1 further comprises an illumination device 9 for generating and emitting a light function into an environment of the motor vehicle headlight 1. The illumination device 9 is arranged within the motor vehicle headlight 1 in such a way that the light function is emitted through the first area 2a of the lens 2.

FIG. 2 shows a second embodiment of a motor vehicle headlight 1 according to the invention. The various embodiments differ on the one hand by a different design of common components, which however have a substantially similar mode of operation, and on the other hand by reversed kinematics when cleaning the lens, which is why, for better understanding the same reference signs are used for substantially similar components.

The motor vehicle headlight 1 comprises a lens 2, wherein the lens 2 is formed from at least two areas 2a, 2b, wherein a first area 2a is designed to be stationary and a second area 2b, the area to be cleaned, is designed to be moveable relative to the first area 2a.

The motor vehicle headlight 1 further comprises a screen 3, which extends from a lower side of the lens 2 vertically towards an upper side of the lens 2, wherein the vertical extent of the screen 3 is smaller than the vertical extent of the lens 2, wherein the screen 3 has an upper edge 3a, which defines the highest vertical extent of the screen 3 relative to the lens 2.

The motor vehicle headlight 1 further comprises a windscreen wiper 4 with a wiper blade 4a, which is arranged in a fixed position between the screen 3 and the lens 2 in such a manner that the wiper blade 4a makes contact with an outside of the lens 2 facing the screen 3. The wiper blade 4a is always located completely below the upper edge 3a of the screen 3 in this embodiment.

A drive device 5 is designed to move the second area 2b of the lens 2 relative to the first area 2a and relative to the wiper blade 4a, wherein the second area 2b can be cleaned by moving the second area 2b and by the contact of the second area 2b with the wiper blade 4a.

The first area 2a has a first material and the second area 2b, the area to be cleaned, has a second material, wherein the first and the second material are different. The first material has a lower hardness than the second material. In the exemplary embodiment shown, the first material is a, preferably transparent, plastic and the second material is a, preferably transparent, glass.

The second area 2b of the lens 2 is rotatably mounted about an axis of rotation 6a, wherein the axis of rotation 6a is oriented substantially orthogonal to the lens 2. The second area 2b can be cleaned by rotating the second area 2b about the axis of rotation 6a and by the contact of the second area 2b with the wiper blade 4a.

Similarly to the first embodiment, the motor vehicle headlight 1 further comprises a sensor device 8 for optically detecting an environment of the motor vehicle headlight 1 and an illumination device 9 for generating and emitting a light function into an environment of the motor vehicle headlight 1.

The optical detection of the environment occurs through the second area 2b of the lens. The light function is emitted through the first area 2a of the lens.

FIG. 3 shows a front view of a further exemplary embodiment. The motor vehicle headlight 1 has two illumination devices 9 and two sensor devices 8 (not shown). The lens 2 has a first area 2a and two second areas 2b, wherein a first sensor device 8 can detect the environment through a first second area 2b and a second sensor device 8 can detect the environment through a second second area 2b. The second area 2b can either be cleaned according to the first or second embodiment. In the exemplary embodiment shown, the screen 3 respectively covers part of the two second areas 2b and part of the first area 2a.

The invention claimed is:

1. A motor vehicle headlight (1) comprising:
   a lens (2), wherein the lens (2) is formed from at least two areas (2a, 2b), wherein a first area (2a) is designed to be stationary and a second area (2b), the area to be cleaned, is designed to be moveable relative to the first area (2a);
   a screen (3), which extends from a lower side of the lens (2) vertically towards an upper side of the lens (2), wherein the vertical extent of the screen (3) is smaller than the vertical extent of the lens (2), wherein the screen (3) has an upper edge (3a), which defines the highest vertical extent of the screen (3) relative to the lens (2);
   a windscreen wiper (4) with a wiper blade (4a), which is arranged in a fixed position between the screen (3) and the lens (2) in such a manner that the wiper blade (4a) makes contact with an outside of the lens (2) facing the screen (3), wherein the wiper blade (4a) is located completely below the upper edge (3a) of the screen (3); and
   a drive device (5), which is designed to move the second area (2b) of the lens (2) relative to the first area (2a) and relative to the wiper blade (4a), wherein the second area (2b) can be cleaned by moving the second area (2b) and by the contact of the second area (2b) with the wiper blade (4a).

2. The motor vehicle headlight (1) according to claim 1, wherein the first area (2a) has a first material and the second area (2b), the area to be cleaned, has a second material.

3. The motor vehicle headlight (1) according to claim 2, wherein the first material has a lower hardness than the second material.

4. The motor vehicle headlight (1) according to claim 2, wherein the first material comprises a plastic and the second material comprises a glass.

5. The motor vehicle headlight (1) according to claim 1, wherein the second area (2b) of the lens (2) is rotatably mounted about an axis of rotation (6a), wherein the axis of rotation (6a) is oriented substantially orthogonal to the lens (2), wherein the second area (2b) can be cleaned by rotating the second area (2b) about the axis of rotation (6a) and by the contact of the second area (2b) with the wiper blade (4a).

6. The motor vehicle headlight (1) according to claim 1, further comprising:
   a sensor device (8) for optically detecting an environment of the motor vehicle headlight (1), wherein the sensor device (8) is arranged within the motor vehicle headlight (1) in such a way that the optical detection of the environment occurs through the second area (2b) of the lens (2).

7. The motor vehicle headlight (1) according to claim 1, further comprising:
   an illumination device (9) for generating and emitting a light function into an environment of the motor vehicle headlight (1), wherein the illumination device (9) is arranged within the motor vehicle headlight (1) in such a way that the light function is emitted through the first area (2*a*) of the lens (2).

8. The motor vehicle headlight (1) according to claim 2, wherein the first material and the second material are different from one another.

\* \* \* \* \*